Nov. 13, 1934.　　　D. F. NEWMAN　　　1,980,285
PROJECTION SCREEN
Filed April 25, 1929
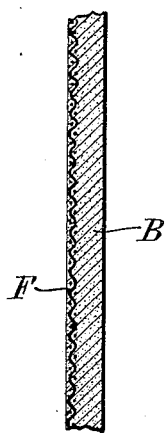
INVENTOR
David F. Newman
BY
　　Ward, Crosby & Neal
ATTORNEYS

UNITED STATES PATENT OFFICE 1,980,285

PROJECTION SCREEN

David F. Newman, Freeport, N. Y., assignor to Trans-Lux Daylight Picture Screen Corporation, New York, N. Y., a corporation of Delaware Application April 25, 1929, Serial No. 358,166

9 Claims. (Cl. 88—24)

My invention relates to a structure, member or surface utilizable in any desired manner and for any desired purpose.

More particularly, my invention relates to a structure, member or surface having a dual function, namely, for the production, reproduction, amplification or propagation, hereinafter generally termed "reproduction" of sound waves and, usually concurrently, for the display of images, representations or the like.

My invention, in one of its prominent phases, relates to or involves a structure, member or surface utilizable as a screen for the display of motion pictures, stereopticon views, or the like and further utilizable as a diaphragm or vibratory member for reproducing sound waves.

My invention relates prominently, but by no means exclusively, to a screen, as aforesaid, of a character adapted for "rear" projection, i. e., that type of projection wherein the projection mechanism is disposed at one side of the screen and the audience at the other side thereof.

According to the invention, a combined sound diaphragm and optical projection screen is formed from translucent base material and a loading material such, for example, as beryllium oxide, the latter causing the diaphragm to effect satisfactory reproduction of sound waves while functioning satisfactorily as an optical projection screen. The loading material has the effect of modifying the frequency response characteristics of the diaphragm and, in view of this fact, the term "vibration-qualifying agent" will be used hereinafter in this specification in place of the term "loading material".

Further objects, advantages and characteristics of my invention will appear from the following detailed description.

My invention resides in the structure, member, surface, screen, diaphragm and features of the character hereinafter described and claimed.

On the drawing, the figure is a fragmentary sectional view of a screen as constructed in accordance with my invention.

In accordance with a preferred form of my invention, there is produced a structure of sheet-like character having the dual function first of serving as a screen or surface displaying or exhibiting representations of any desired character projected thereon and, second of serving as a diaphragm to reproduce sound waves or vibrations.

More specifically, in accordance with the preferred form of my invention, the aforesaid screen or surface is disposed, usually, substantially vertically between an audience and suitable projection mechanism from which emanates a beam of light passing to the eyes of an audience after traversing said screen or surface. The aforesaid projection mechanism may be and ordinarily is of a character coactable with motion picture film bearing representations or pictures and through which the aforesaid beam of light passes to effect the display of images of said representations or pictures on said screen or surface. Simultaneously with said display, the aforesaid screen or surface may be actuated or vibrated to reproduce or to serve in the reproduction of intelligible sound for the aforesaid audience.

A screen or surface utilizable in accordance with the more specific form of my invention may be constructed or produced in a variety of ways. As shown on the drawing, such screen or surface comprises a base B, in turn, comprising one or more materials utilizable as the screen body. With such a material or materials, there is usually associated a light-diffusing agent, a light-filtering agent, an agent having germicidal, bacteriacidal, fungicidal, and/or preservative qualities, a vibration-qualifying agent, and a curing agent.

To form the screen body, it has been demonstrated that gelatine and glycerine taken with the proper amount of water are satisfactory, the water being filtered or distilled when necessary. In general, substantially equal amounts of the gelatine and glycerine may be utilized; the amount of water depends upon the condition and character of the various agents, particularly the gelatine, but usually, an amount of water substantially greater than the amount of either the gelatine or glycerine is required. The gelatine should be substantially neutral and may be obtained from glue in turn obtained from materials of any suitable character. Or, ordinary glue may be utilized. In lieu of the glycerine there may be utilized suitable other material as ethylene-glycol or di-ethylene-glycol.

The light-diffusing agent may be a single material or a combination, in suitable ratio, of a plurality of materials. Said light-diffusing agent governs the degree of translucency or light-transmission factor or characteristic of the completed screen. Numerous materials are satisfactory for light-diffusing purposes. Typical examples are zinc oxide, magnesium oxide, magnesium carbonate, zinc sulphide, ordinary starch, casein, silica, ground glass, etc., etc.

In order to reproduce upon the screen with a satisfactory degree of faithfulness the color values in the field being projected, I find it desirable to so contruct the screen that it will be neutral or nearly so when acted upon by the light from the projector and, inasmuch as this light usually contains an excess of yellow rays, a filtering agent may be employed to obtain the proper screen effect. Without this filtering agent, for example, white on the screen appears as a tan color, and other colors are affected correspondingly. Obviously, the character of the source of light is largely controlling, but, in general, only a small amount of the light-filtering agent is required in comparison to the amount of the materials comprised in the screen body. It has been demonstrated that cobalt blue (oxides of cobalt and aluminum) is satisfactory for light-filtering purposes. Similarly, the aniline dyes, specifically aniline blue, may be utilized, if desired.

To render the completed screen suitably resistant to the action of germs, bacteria or fungi and to preserve the same, a germicidal, bacteriacidal, fungicidal, and/or preservative agent or material such as sodium fluoride may be employed. Ordinarily, a small quantity of such material suffices, the amount thereof usually being much less than that of the aforesaid body ingredients. In lieu of sodium fluoride there may be utilized suitable other substances, as boric acid, sodium salicylate, many forms of phenol, etc.

In accordance with my invention, there is utilized a material, agent or agents imparting a desired diaphragm characteristic or characteristics to the screen or causing said screen to exhibit a characteristic or characteristics whereby sound is faithfully reproduced, said agent or agents, for one reason or another, producing a screen which, when vibrated throughout substantially its entire area, or otherwise as may be desirable, reproduces sound, for example, in a much more faithful manner than does the screen disclosed in U. S. Letters Patent No. 1,881,128. It is known that such agent or agents alter or change the otherwise natural vibratory period of the screen and it is believed that said agent or agents desirably modify said vibratory character of the screen; hence said agent or agents are herein designated as "vibration-qualifying" in character. In accordance with this phase of my invention, any suitable material may be utilized. It has been demonstrated that a material having some physical characteristics of the aluminum family, specifically, glucinum or beryllium oxide gives satisfactory results.

The amount to be used depends upon circumstances and upon the quality or character to be imparted thereby to the completed screen. Ordinarily, however, only a small amount is required in comparison to the amounts of material comprised in the screen body. In lieu of the aforesaid material, aluminum hydrate, may be utilied if desired.

To facilitate, modify or control the rate at which the screen or screen materials approach its or their final or permanent state, it is desirable to employ a curing agent or material, one function of which is to harden, dry, fix or preserve the aforesaid gelatinous material, thereby when the curing agent is formaldehyde, forming insoluble formo-gelatine, and another function of which, it is believed, is to modify the vibratory period of the screen. Any material suitable for curing purposes may be employed. When beryllium oxide is employed, as aforesaid, it has been demonstrated that a solution of formaldehyde yields desirable results. The amount to be used depends upon many factors, such as the general atmospheric conditions that obtain in the locality where the screen is to be used, the time available, the desired character of the screen when completed, etc. In general, a very small amount is required in comparison to the amounts of material comprised in the screen body. In lieu of formaldehyde, other members of the aldehyde group may similarly be utilized, such for example as acrylic aldehyde, acetic aldehyde, or the like.

Merely by way of one example of my invention and for purposes of explanation, a satisfactory formula is herewith stated qualitatively and quantitatively as follows:

|  | Grams |
|---|---|
| Body { Gelatine | 450 |
| Body { Glycerine | 570 |
| Body { Water (more or less) | 900 |
| Light-diffusing agent: zinc oxide | 20 |
| Light-filtering agent: cobalt oxide | 6 |
| Germicidal, etc. agent: sodium fluoride | 25 |
| Vibration-qualifying agent or loading material: beryllium oxide | 40 |
| Curing agent: 10% sol. formaldehyde | 14 |

These materials, proportioned as noted above or otherwise as may be desirable, may be mixed and brought to a homogeneous semi-fluid or viscous condition in any suitable manner. For example, all, ordinarily except the curing agent, may be mixed together and then elevated in temperature, preferably gradually, until a temperature well above room temperature is reached, such for example, as within the range of 130° F. to 170° F., more or less. During continued application of heat, the mass of material should be slowly stirred until and after all of the ingredients have been formed into a homogeneous mass.

A more preferable way, however, involves separate treatment of some of the materials. To this end, the gelatine may be soaked with some of the water for an extended period, for example from 4 to 10 hours, more or less. Thereafter, the partly mixed gelatine and water should be heated slowly and slowly stirred until a viscous condition is produced.

At this time, one or more of the other ingredients or materials may be added. This holds true for the glycerine, the zinc oxide and the sodium fluoride. Preferably the zinc oxide and the sodium fluoride are first mixed separately with some of the water. The sodium fluoride may be added at this time but preferably it is placed with water and gelatine when the latter is allowed to soak.

During continued application of heat within substantially the limits above noted, the mixture should be stirred until the mass has become homogeneous. Thereafter, the mixture should be strained to remove all possible extraneous matter.

After the mixture has been mixed and strained as just noted and while its temperature is approximately of the order stated, the cobalt oxide may be added. Preferably, a small part of the glycerine is placed aside and, with this, the cobalt oxide is mixed prior to addition thereof to the aforesaid strained mixture.

The beryllium oxide preferably is made into a thin paste with some of the water and then added to the aforesaid strained mixture at the same time that the cobalt oxide is added thereto.

Preferably, the formaldehyde is added last, or as herein after described, the formaldehyde may be applied or employed during or after the molding operation.

After the ingredients last named have been mixed thoroughly, the resultant mixture is suitably molded to produce a structure, member or surface of any desired character and of any desired configuration. Ordinarily, said structure, member or surface is plane, and of sheet-like characteristics, the thickness thereof being as desired; ordinarily, however, the preferred thickness is small, as of the order of $\frac{1}{32}$, $\frac{1}{16}$, or $\frac{1}{8}$ of an inch, more or less.

When a structure, member or surface of the character last described is to be produced, there may be employed, for the molding operation, a suitable matrix table embodying a plane surface of suitable material and extent or area for the reception of the aforesaid mixture. The surface of the table should be bordered by a retaining wall of a height substantially equal to the thickness of the screen to be produced and it should be heated to suitable extent, preferably within a range somewhat below the temperature of the aforesaid mixture.

After the matrix table has been brought to such suitable temperature conditions as stated and with the aforesaid mixture in proper condition, the latter should be poured on or applied to the table, preferably until it slightly overflows the bordering wall thereof. The excess material should now be removed, as by a straight edge.

In accordance with my invention and preferably, although not necessarily, suitable fabric material F is incorporated in or with the viscous material on the matrix table at this stage of the operation. This fabric material F, for example, may be a sheet of georgette silk from which all of the foreign matter such as gums, resins, etc., has been suitably removed. Previously, the silk sheet should have been stretched on a frame having an opening of such extent that it fits suitably around the aforesaid bordering wall of the matrix table.

After the excess material has been removed as stated above, the sheet of silk is suitably lowered toward and into engagement with the upper surface of the material on the matrix table, care being taken to avoid entrapping air between the silk sheet and the viscous material. In so doing, the frame holding the silk sheet comes into position around the bordering wall of the matrix table, and thereupon the silk sheet sinks into or amalgamates with said viscous material. At this time, application of heat to the matrix table should be discontinued, and after a suitable cooling period, as two or three hours, has elapsed, a knife should be passed between the frame holding the silk sheet and the bordering wall of the table to sever said sheet from its frame. Thereupon, the molded screen may be removed from the matrix table in any suitable manner.

Thereafter, the edges of the screen should be suitably bound, as by canvas, or equivalent, strips adhesively secured, thereto and provided with eyelets. When the screen is installed for use, a suitable frame should be provided and the screen positioned tautly therein, as by rope passing through the eyelets and engaging the frame. Ordinarily, the screen of my invention is stretched much tighter than is the screen described in the aforesaid U. S. Letters Patent No. 1,881,128. In other words, ordinarily, the screen is stretched much tighter when sound is to be reproduced than is the screen of said U. S. Letters Patent No. 1,881,128. However, this degree of stretching is not always necessary.

A screen constructed in accordance with my invention is durable and functions in an entirely satisfactory manner for the display of representations to an audience. As a diaphragm or vibratory member, it functions in an equally satisfactory manner to reproduce or to serve in the reproduction of sound waves with clarity and great volume. The screen is vibrated or actuated by one or more mechanisms connected thereto, which are operated or controlled in any suitable manner, as by an electrical current varied in accordance with sound vibrations, such as speech or music; said mechanisms being brought into proper contact with the screen in any suitable manner.

In accordance with my invention, the curing agent or material may be applied to or associated with the other material in any suitable or desired manner. As hereinbefore described, said curing agent or material is mixed with the other ingredients. As well, however, and in some cases preferably, it may be applied at other times. Thus for example, application of said curing agent or material may be postponed until the other material is on the matrix table when it may be suitably applied, as by a spraying device. Or, application of said curing agent or material may be deferred until the molding operation is complete, or if desired until after the structure or screen has been removed from the matrix table.

The strength of the curing agent or material determines the rapidity with which the screen approaches its completed condition. Where time is essential, the strength may be relatively high, but otherwise the strength may be less. Where a screen is to be transported a great distance to the place of installation, the curing process may be effected while it is en route and the strength of the curing material may be such that the curing process is completed at about the time the screen reaches its destination. Or, if desired, said curing agent may be applied after the screen reaches its destination.

A highly important feature of my invention resides in the provision or production of a screen having varying sound reproducing diaphragm characteristics, not alone throughout the entire extent thereof, but to more or less extent in one or more local regions only. Thus, for example, in a local region, the vibratory characteristic may be modified or increased while in the area therearound, either partly or entirely, the vibratory characteristic is different, less or lower, although said last named area usually vibrates in synchronism with said local region. In accordance with my invention and to effect the result just described, the curing agent or material is applied only to one or more of the aforesaid small areas or local regions and not to the surrounding adjacent screen surface. Such local application of the curing agent or material may readily be effected, for example, by a spraying device after the other screen-forming material is on the matrix table, or after removal therefrom by a brush or spraying device.

Under some circumstances, it may be desirable to suitably mark, groove, or etch the surface of the matrix table to thereby produce similar markings, grooves or etchings on the screen. These, of course, may assume any of a great number of selected designs.

As hereinbefore stated, the screen or surface thus specifically described is adapted for "rear" projection and for the reproduction of sound. Under such circumstances, the amount of the light-diffusing agent, whether zinc oxide or other equivalent material, should be of the order specified or substantially less than the amounts of the body material.

Ordinarily, a screen adapted for "rear" projection is not suitable for "front" projection, i. e., the type wherein the projecting mechanism and the audience are on the same side of the screen, the light being reflected to the audience by the screen. However, in accordance with one form of my invention, the amount of the light-diffusing agent may be greatly or substantially increased, while maintaining the remaining formula ratio substantially as stated, if desired, to thereby produce a screen adapted and utilizable for "front" projection, the degree of opacity desired generally governing the amount of said light-diffusing agent to be utilized. A screen of the character just described is especially suitable for "front" projection and also functions efficiently and satisfactorily as a sound reproducing device or diaphragm. Or, a screen utilizable for "front" projection and sound reproduction may be formed otherwise in any suitable manner.

In accordance with a very specific and preferred form of my invention, zinc oxide and beryllium oxide are the preferred agents or materials utilizable, respectively, for the purposes hereinbefore stated. These materials, associated as they are, produce a screen that is highly satisfactory both from the representation display and sound reproducing viewpoints. Under some circumstances, it may be desirable to increase the amount of beryllium oxide while decreasing the amount of zinc oxide, and vice versa.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent, is:

1. A combined sound diaphragm and optical projection screen comprising translucent base material, light-diffusing means for obtaining a light-transmission factor sufficiently high for rear projection practice, and loading material for causing the diaphragm to effect satisfactory reproduction of sound waves, said materials and means producing a rear projection screen of flexible, translucent character.

2. A structure adapted to serve as a diaphragm in the reproduction of sound and for the display of representations upon passage of a light beam therethrough, said structure comprising a body, light-diffusing material determining the translucency of said body to a selected degree, and loading material for causing said structure to effect satisfactory reproduction of sound waves.

3. A structure adapted to serve as a diaphragm in the reproduction of sound and for the display of representations upon coaction of a light beam therewith, said structure comprising a body, material comprising beryllium oxide for imparting a sound reproducing diaphragm characteristic to the structure when completed, and a curing agent incorporated with said structure before completion thereof.

4. A structure adapted to serve as a diaphragm in the reproduction of sound and for the display of representations upon coaction of a light beam therewith, said structure comprising a body, material comprising beryllium oxide for imparting a sound reproducing diaphragm characteristic to the structure when completed, and a curing agent comprising formaldehyde incorporated with said structure before completion thereof.

5. A structure adapted to serve as a diaphragm in the reproduction of sound and for the display of representations upon coaction of a light beam therewith, said structure having a body comprising gelatinous material and glycerine, said structure comprising a light-diffusing agent, a curing agent, and loading material for causing said structure to effect satisfactory reproduction of sound waves.

6. A structure adapted to serve as a diaphragm in the reproduction of sound and for the display of representations upon coaction of a light beam therewith, said structure having a body comprising gelatinous material and glycerine, said structure comprising a light-diffusing agent, a curing agent, an incorporated sheet of fabric, and loading material for causing said structure to effect satisfactory reproduction of sound waves.

7. A structure adapted to serve as a diaphragm in the reproduction of sound and for the display of representations upon coaction of a light beam therewith, said structure having a body comprising gelatinous material and glycerine, said structure comprising a light-diffusing agent, a light-filtering agent, a germicidal, bacteriacidal, fungicidal or preservative agent, a curing agent, and loading material for causing said structure to effect satisfactory reproduction of sound waves.

8. A structure adapted to serve as a diaphragm in the reproduction of sound and for the display of representations upon coaction of a light beam therewith, said structure having a body comprising gelatinous material and glycerine, said structure comprising a light-diffusing agent, a light-filtering agent, a germicidal, bacteriacidal, fungicidal or preserving agent, a curing agent, an incorporated sheet of fabric, and loading material for causing said structure to effect satisfactory reproduction of sound waves.

9. A combined sound diaphragm and optical projection screen comprising translucent base material, light-diffusing means for obtaining a light-transmission factor sufficiently high for rear projection practice, and beryllium oxide for causing the diaphragm to effect satisfactory reproduction of sound waves.

DAVID F. NEWMAN.